(12) United States Patent
Migdal et al.

(10) Patent No.: US 12,437,295 B2
(45) Date of Patent: Oct. 7, 2025

(54) CART/BASKET FRAUD DETECTION PROCESSING

(71) Applicant: NCR Voyix Corporation, Atlanta, GA (US)

(72) Inventors: Joshua Migdal, Wayland, MA (US); Shayan Hemmatiyan, Belmont, MA (US)

(73) Assignee: NCR Voyix Corporation, Atlanta, GA (US)

( * ) Notice: Subject to any disclaimer, the term of this patent is extended or adjusted under 35 U.S.C. 154(b) by 442 days.

(21) Appl. No.: 17/186,524

(22) Filed: Feb. 26, 2021

(65) Prior Publication Data

US 2022/0277299 A1    Sep. 1, 2022

(51) Int. Cl.
| | |
|---|---|
| *G06Q 20/38* | (2012.01) |
| *G06N 20/00* | (2019.01) |
| *G06Q 20/40* | (2012.01) |
| *G06Q 30/0601* | (2023.01) |
| *G06T 7/00* | (2017.01) |
| *G06V 30/18* | (2022.01) |

(52) U.S. Cl.
CPC ............ *G06Q 20/389* (2013.01); *G06N 20/00* (2019.01); *G06Q 20/401* (2013.01); *G06Q 30/0633* (2013.01); *G06Q 30/0641* (2013.01); *G06T 7/00* (2013.01); *G06V 30/18* (2022.01)

(58) Field of Classification Search
CPC ............... G06Q 20/389; G06Q 20/401; G06Q 30/0633; G06Q 30/0641; G06Q 20/208; G06N 20/00; G06T 7/00; G06V 30/18; G06V 10/25; G06V 10/763; G06V 10/764; G06V 20/52; G06F 18/23213; G06F 18/24; G07G 1/0063
See application file for complete search history.

(56) References Cited

U.S. PATENT DOCUMENTS

| | | | |
|---|---|---|---|
| 11,068,702 B1* | 7/2021 | Steinberg | G06V 40/50 |
| 11,620,839 B2* | 4/2023 | Liu | G06V 30/18105 382/103 |
| 11,921,773 B1* | 3/2024 | Adler | G06F 16/538 |
| 12,073,354 B2* | 8/2024 | Kravitz | G07G 1/0018 |
| 2009/0268939 A1* | 10/2009 | Connell, II | G06Q 30/06 382/100 |
| 2018/0096567 A1* | 4/2018 | Farrow | G06V 40/161 |
| 2019/0303676 A1* | 10/2019 | Costello | G06V 20/52 |
| 2020/0410278 A1* | 12/2020 | Nelson | G06F 18/22 |
| 2021/0287013 A1* | 9/2021 | Carter | G06F 18/21 |
| 2022/0005327 A1* | 1/2022 | Cleper | G06K 7/1413 |
| 2022/0058609 A1* | 2/2022 | Takeno | G07G 1/0063 |
| 2022/0194454 A1* | 6/2022 | Carter | G06F 18/21 |
| 2023/0316251 A1* | 10/2023 | Yamada | G06Q 20/3274 705/21 |

* cited by examiner

*Primary Examiner* — Helen Zong
(74) *Attorney, Agent, or Firm* — Schwegman Lundberg & Woessner, P.A.

(57) ABSTRACT

An image of a cart/basket is captured based on a triggering event associated with a transaction at a transaction terminal. A determination is made whether the cart/basket is empty or nonempty from the image. When the cart/basket is nonempty a determination is made whether the nonempty cart includes one or more legitimate items or saleable items associated with a store. When the cart/basket is nonempty with one or more saleable items remaining in the cart/basket, and alert is raised to suspend completion of the transaction at the transaction terminal for intervention and audit of the transaction.

19 Claims, 4 Drawing Sheets

CART/BASKET FRAUD DETECTION PROCESSING

BACKGROUND

Cart/Basket-based theft accounts for a significant fraction of loss that takes place at self-checkout stations for retailers. Consequently, many retailers are forced to maintain staff who monitor self-checkouts and who perform audits on some customers before they exit the stores with their purchased items.

Sometimes the theft is unintentional, the customer simply does not realize that one or more items remain in the cart and was never scanned or entered for the transaction during checkout.

The problem is more noticeable for self-checkouts but also occurs during assisted checkouts. Often the clerk cannot see over the checkout counter to observe what is in the bottom of a customer's cart during checkout. Checkout queues may be long during heavy customer traffic of reduced staffing, such that the attentiveness of the clerk is not what it should be or is not what is expected of the clerk. Furthermore, some clerks may actively participate in the theft by the customer when the customer is known to the clerk or when the customer is a family member of the clerk (often referred to as "Sweethearting").

The problem is also not an easy one to solve for the retailers absent human oversight and auditing because items remaining in a cart during checkout may be legitimate non-saleable items, such as a purse, a bag of fast food, a drink of the customer, or even a small child that is with the customer and is sitting in the cart. But the human oversight and auditing adds to retailer expenses, is still subject to being compromised (due to inattentiveness or Sweethearting), and adds to customer frustration/displeasure with the retailer when queues form near the exit as a staff member performs a receipt and cart comparison audit (customers also do not like the idea of believing that they were singled out or targeted for an audit when human audits are random or only triggered based on a high value transaction or other retailer specific factors).

As a result, retailers continue to sustain significant losses due to customers leaving the store with non-purchased items in their carts.

SUMMARY

In various embodiments, methods and a system for cart/basket fraud detection processing are presented.

According to an embodiment, a method for cart/basket fraud detection processing is presented. An image of a transaction area is obtained during a transaction at a transaction terminal based on a transaction event. A determination is made as to whether a cart/basket is present within the image. A second determination is made as to whether the cart/basket is nonempty or empty when the cart/basket is determined to be present within the image. A third determination is made as to whether the cart/basket includes at least one saleable item when the cart/basket is determined to be nonempty. The transaction at the transaction terminal is suspended for intervention when the cart/basket is determined to include the saleable item.

DETAILED DESCRIPTION

Figure 1A:
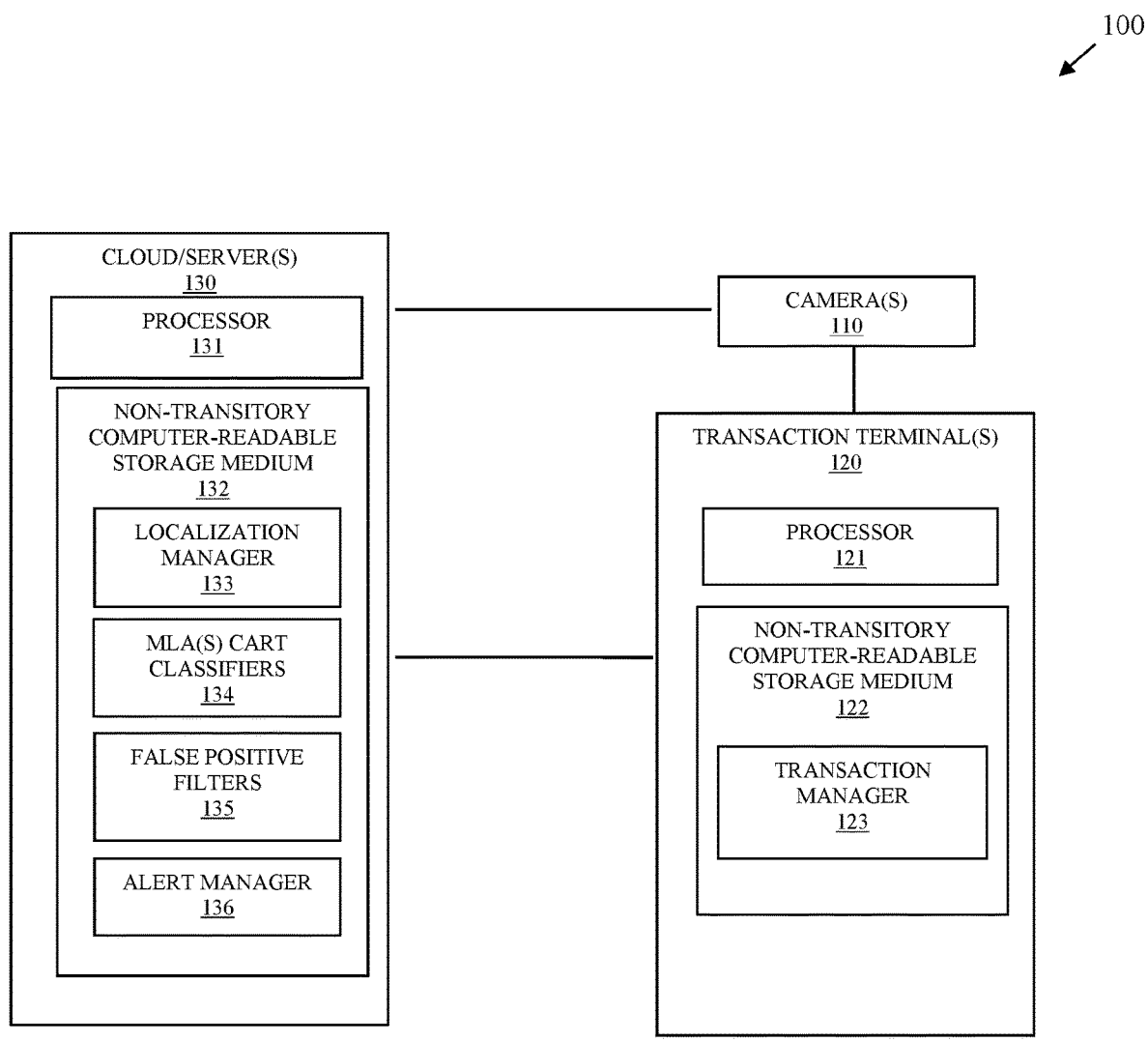
FIG. 1A is a diagram of a system for cart/basket fraud detection processing, according to an example embodiment.

FIG. 1A is a diagram of a system 100 for cart/basket fraud detection processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of cart/basket fraud detection processing, presented herein and below.

System 100 includes one or more cameras 110, one or more transaction terminals 120, and one or more clouds/servers 120.

The camera(s) 110 captures video and/or images of a designated area (such as, and by way of example only, a transaction area (checkout lane) of a transaction terminal during a transaction); the video and/or images are streamed in real time to cloud/server 120 or any other network location or network file accessible to cloud/server 120. For example, the video/images may be streamed to a local server location within a given store and cloud/server 120 detects when the video/image is written to the local server location and obtains the video/images when needed for fraud evaluation during a checkout for a transaction at the transaction terminal.

Each transaction terminal 120 comprises a processor 121 and a non-transitory computer-readable storage medium 122. Medium 122 comprises executable instructions representing a transaction manager 123. Transaction manager 123 when executed by processor 121 from medium 122 causes processor 121 to perform operations discussed herein and below with respect to transaction manager 123.

It is to be noted that each transaction terminal 120 may comprise various peripherals such as and by way of example only, an item barcode scanner, a touchscreen display, a keypad, a Personal Identification Number (PIN) pad, a receipt printer, a currency acceptor, a coin acceptor, a currency dispenser, a coin dispenser, a valuable media depository, a card reader (contact-based (magnetic and/or chip) card reader and/or contactless (wireless) card reader (Near-Field Communication (NFC), etc.)), one or more integrated cameras, a produce weigh scale (which may be integrated the scanner as a composite peripheral device comprising an item barcode reader and weigh scale), a bagging weigh scale, a microphone, a speaker, a terminal status pole with integrated lights, etc.

Server 130 comprises a processor 131 and a non-transitory computer-readable storage medium 132. Medium 132 comprises executable instructions for a localization manager 133, one or more machine-learning algorithm (MLA) cart classifiers 134, one or more false positive filters 135, and an alert manager 136.

The executable instructions 133-136 when executed by processor 131 from medium 132 causes processor 131 to perform operations discussed herein and below with respect to 133-136.

As will be illustrated more completely herein and below, system 100 permits a fast, an efficient, and an accurate cloud-based mechanism for determining whether a given transaction and a given cart/basket associated with the transaction has one or more saleable items that remain the cart/basket after a conclusion to the transaction was initiated. The system 100 can be leveraged/shared across a plurality of disparate retailers and a plurality of stores associated with each retailer for purposes of quickly and accurately identifying transaction theft (intentional or unintentional).

At least one image is selectively obtained of the transaction area that is associated with an initiation of payment to conclude the transaction at terminal 120. The image is quickly processed to determine if a cart/basket is present or not, and if present to localize the image pixels from the image associated with the cart/basket into pixel coordinates within the image to define a bounding box for the cart/basket within the image. The bounding box is cropped from the image and passed to a classifier 134 where a determination is made whether the cart/basket is empty or non-empty. When classifier 134 indicates the cart/basket is non-empty, one or more filters 135 are processed to identify if the non-empty cart/basket includes one or more saleable items of the store or includes legitimate non-saleable items. The filters 135 may also be trained MLAs some of which may be specific to saleable items within a given store associated with terminal 120. When one or more saleable items are present, an alert manager 136 sends an alter to transaction manager 123 to suspend or withhold processing payment for the transaction causing a staff member of the store to be dispatched to the transaction terminal 120 for review of the transaction and the one or more saleable items present in the non-empty cart/basket.

System 100 may be deployed for transaction terminals 120 that are Self-Service Terminals (SSTs) during self-checkouts by customers and/or for transaction terminals 120 that are Point-Of-Sale (POS) terminals operated by staff of a given store during assisted customer checkouts.

As used herein the terms "cart" and "basket" may be used synonymously and interchangeably.

Cameras 110 may be overhead cameras situated above transaction areas of terminals 120 designed to capture in the video/images the lane and terminal 120 during transactions. Cameras 110 may be connected to server 130, may be connected to terminal 120, or may be connected to neither server 130 nor terminal 120 (e.g., the cameras 110 simply capture the video/images and write the video/images to a predefined storage buffer, which is accessible to server 130—the predefined storage buffer may be associated with a Local Area Network (LAN) server of the store or may be associated with a Wide Area Network (WAN) server of the retailer associated with the store).

Metadata associated with the captured video/image at least includes a store identifier and camera identifier along with a time and date stamp. In some cases, the metadata may include a transaction terminal identifier for terminal 120. The metadata allows alert manager 136 to quickly identify the store and the terminal 120 associated with a given video/image. Alert manager utilizes an Application Programming Interface (API) associated with a given store POS system or transaction system to dynamically send fraud alerts in real time to transaction manager 123 during transactions at terminal 120.

During operation of system 100 (discussed within the context of method 150 shown in FIG. 1B), an image is obtained for evaluation at 151 by localization manager 133. The image is obtained based on a transaction-based trigger event raised by an API associated with transaction manager 123. The trigger event may be when an operator (customer in the self-checkout scenario and staff in the assisted checkout scenario) activates an option to conclude a transaction for transaction payment. In some cases, a continuous stream of images (video) is being received/obtained by cloud/server 130 of the transaction area for terminal 120, when the trigger event is detected a last captured image of the transaction area is obtained based on a time stamp associated with the trigger event and a time stamp of the last captured image (a time just before or at the time of the trigger event).

The image is provided to localization manager 133 where an object present in the image matching a cart/basket is processed for purposes of obtaining pixel coordinates within the image that are associated with an area defining the cart/basket.

In an embodiment, the localization manager 133 is a trained MLA (MLA may also be referred to herein as a "machine-learning model (MLM)" or just a "model") trained on images of transaction areas to recognize and identify within the images the boundaries and the area associated with a cart/basket. During re-training to account for false cart/basket detections or nocart/basket detection, the each original trained image may be replicated, rotated, and manipulated for scaling and/or brightness variations and used to re-train the model. In this way, during re-training mistakes detected in the original model receive greater weights or are magnified by replicating the original training image into a plurality of images during the retraining for a known mistake (no basket detected or incorrect basket detected); the replicated images are manipulated versions of the original image that are rotated, obtained at different angles, adjusted for brightness, scaling, etc. In an embodiment, the localization manager 133 is a YOLO® trained model (for example, a tinyolov4 model).

The output of the localization manager 133 provides the pixel coordinates for any cart/basket within the image.

It is to be noted that if no cart/basket is identified by localization manager 133, then the processing from system 100 concludes and does not proceed at 153, since if no cart/basket is present there is no concern with any cart/basket transaction fraud.

At 153, the pixel coordinates are processed to crop the pixels associated with the cart/basket from the image thereby substantially reducing the overall size in pixels from what was present with the original captured image and image processed by localization manager 133. In an embodiment, a K-Means clustering algorithm is processed to identify a substantial center of the cart/basket and to crop the cart/basket from the image. In an embodiment, the cropped cart/basket pixels are then resized and normalized to a canonical resolution of approximately 256 pixels by 256 pixels.

The cropped image of the cart/basket is then fed as input to MLM classifier 134 at 154. MLM classifier 134 is trained to produce three classifications, a non-cart classification, an empty cart/basket classification, and a nonempty cart/basket classification. The non-cart/basket classification is utilized to correct for when the localization manager 133 incorrectly identified a cart/basket in the image. The MLM classifier 134 is trained on the cropped image produced from output of localization manager 133 and optionally resized and normalized. In an embodiment, the MLM classifier 154 is a trained 3-class Resnet18® model.

When the output from MLM classifier 134 at 154 is a non-cart classification or an empty classification, alert manager 136 concludes processing since there is no detected cart/basket fraud for the transaction.

When the outputted classification from MLM classifier 134 at 154 is a non-empty cart classification, alert manager 136 provides the cropped and optionally resized and normalized image as input to one or false positive filters 135 at 155. These can be cascading, or pipelined trained machine-learning models designed to quickly identify objects in the cart/basket (via the cropped image provided as input) that are associated with known legitimate objects (a child, a drink cup or mug, a purse, etc.). In an embodiment, some of the filters 135 at 155 may be trained to specifically identify saleable items for a specific store associated with terminal 120 (e.g., these filters may be specific to a produce catalogue of items associated with the store).

At 156, alert manager 136 receives output classifications of the non-empty items present in the cart/basket and when it is determined that there is not any store saleable items in the cart/basket (e.g., the status of the non-empty classification is legitimate items or item), alert manager 136 concludes processing since there is no cart/basket fraud detected for the transaction.

When, at 156, the status for the cart is non-empty with at least one saleable item, alert manager 135 at 157 using an API specific to the store or retailers POS system or transaction system to send a transaction terminal identifier and an alert to transaction manager 123 of terminal 120. This causes transaction manager 123 to halt the transaction (not allow payment processing for the transaction to complete) and process a fraud workflow that causes an attendant to be dispatched to terminal 120 for an audit and inspection of the transaction details for the transaction and the cart/basket for the saleable item(s) detected.

In an embodiment, alert manager 136 also provides to transaction manager 123 one or more item identifiers for the specific saleable items that were detected as being present in the cart/basket, such that when the attendant arrives at terminal 120 and signs in for transaction override authority, transaction manager 123 displays to the attendant the transaction details for the transaction and the item identifiers/item descriptions for the saleable items detected as being presenting in the cart/basket when the operator of terminal 120 initiated payment processing to conclude the transaction. The attendant can then quickly identify whether fraud was present or not present for the transaction.

When fraud was not present, the image associated with the non-fraud situation can be used in a training data sets to retain MLM classifier 134 and/or one or more of the filters 135. This provides a continuous feedback loop used to train MLM classifier 134 and filters 135, such that their output classifications become more precise and accurate over time with continuous learning. Even when fraud was present the specific determined fraud by the attendant, can be used in retaining the models 134 and 135 to provide more precise and accurate classifications over time with continuous learning. For example, an item identifier produced as output by one of the filters 135 may have been different from what the actual item was when the attendant audited the transaction, such that using the actual item as an expected output classification during a retraining session with that filter 135 will improve the accuracy and precision of item recognition for saleable items of the store.

In an embodiment, system 100 is continuously evaluating a stream of images from a video captured during the whole transaction process and maintains a current status of the cart/basket as the transaction progresses. If the status of the cart never changes from a non-empty classification when the transaction moves to a pay for transaction state and filters 135 indicate at least one saleable item is present in the non-empty cart, the alert is raised by alert manager 136 to transaction manager 123.

In an embodiment, system 100 separately maintains bounding boxes for each item detected within a non-empty cart cropped, resized, color or brightness adjusted, and normalized image. These separate bounding boxes can be cropped, resized, color or brightness adjusted, and normalized as individual images fed as input to filters 135 for purposes of efficiently recognizing each item as a legitimate item or a specific saleable item of the store.

One now appreciates how an automated cart/basket fraud determination can be quickly and efficiently processed. This substantially reduces theft from retailers, improves transaction security, and reduces expenses associated with superfluous staff oversight of transactions. Moreover, this is particularly beneficial for self-checkouts at SSTs but is also beneficial for assisted checkouts at POS terminals. Furthermore, system 100 is sharable and leverageable from a cloud 130 for deployment across multiple disparate retailers and multiple stores for a single retailer. Additionally, false positive filters 135 for saleable item recognition can be customized based on each store's product catalogue.

The above-noted embodiments and other embodiments are now discussed with reference to FIGS. 2-3.

Figure 2:
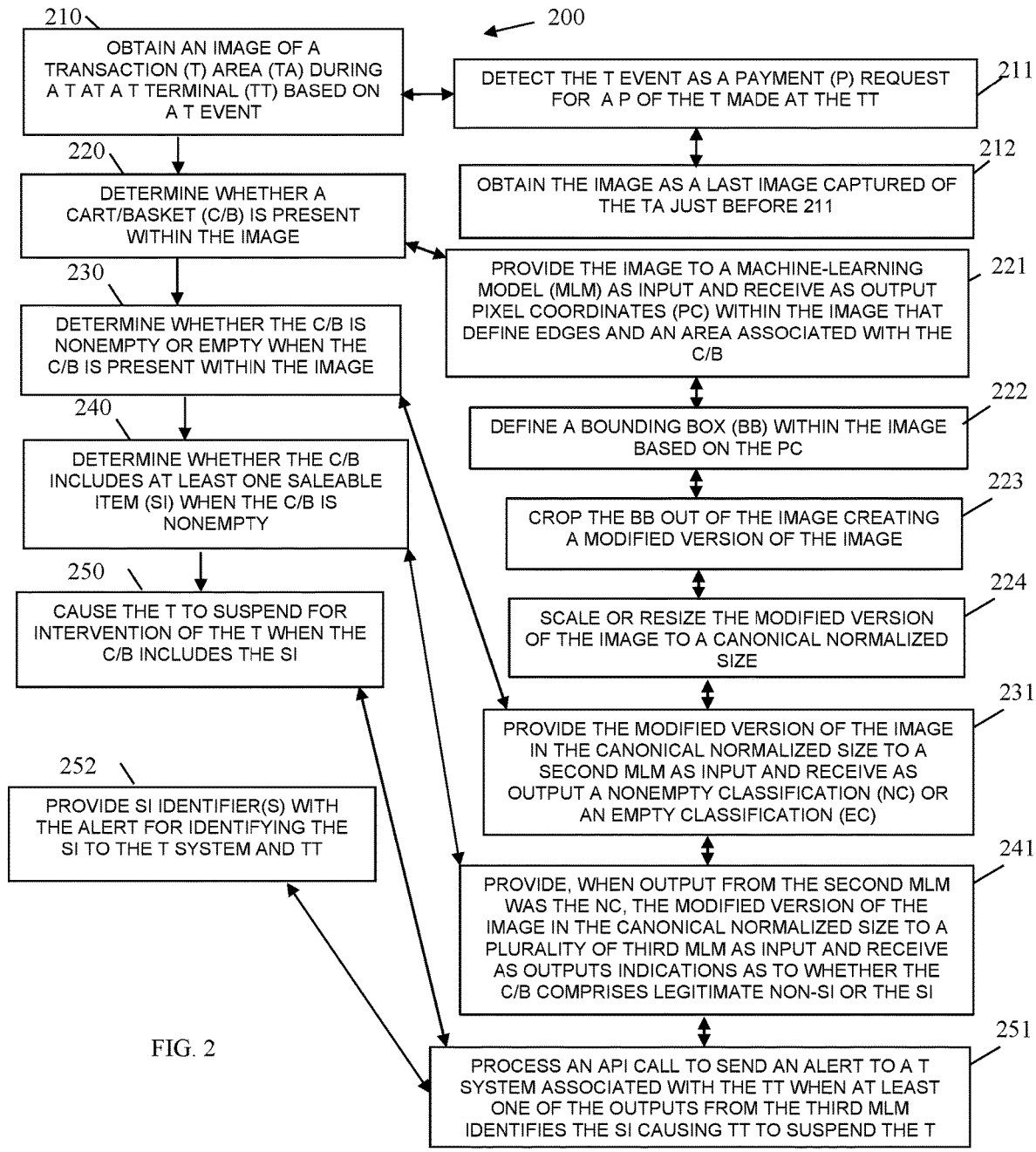
FIG. 2 is a diagram of another method for cart/basket fraud detection processing, according to an example embodiment.

FIG. 2 is a diagram of a method 200 for cart/basket fraud detection processing, according to an example embodiment. The software module(s) that implements the method 200 is referred to as a "cart/basket fraud manager." The cart/basket fraud manager is implemented as executable instructions programmed and residing within memory and/or a non-transitory computer-readable (processor-readable) storage medium and executed by one or more processors of a device or set of devices. The processor(s) of the device(s) that executes the cart/basket fraud manager are specifically configured and programmed to process the cart/basket fraud manager. The cart/basket fraud manager may have access to one or more network connections during its processing. The network connections can be wired, wireless, or a combination of wired and wireless.

In an embodiment, the cart/basket fraud manager executes on server 120. In an embodiment, the server 120 is one of multiple servers that logically cooperate as a single server representing a cloud processing environment (cloud 120).

Figure 1B:
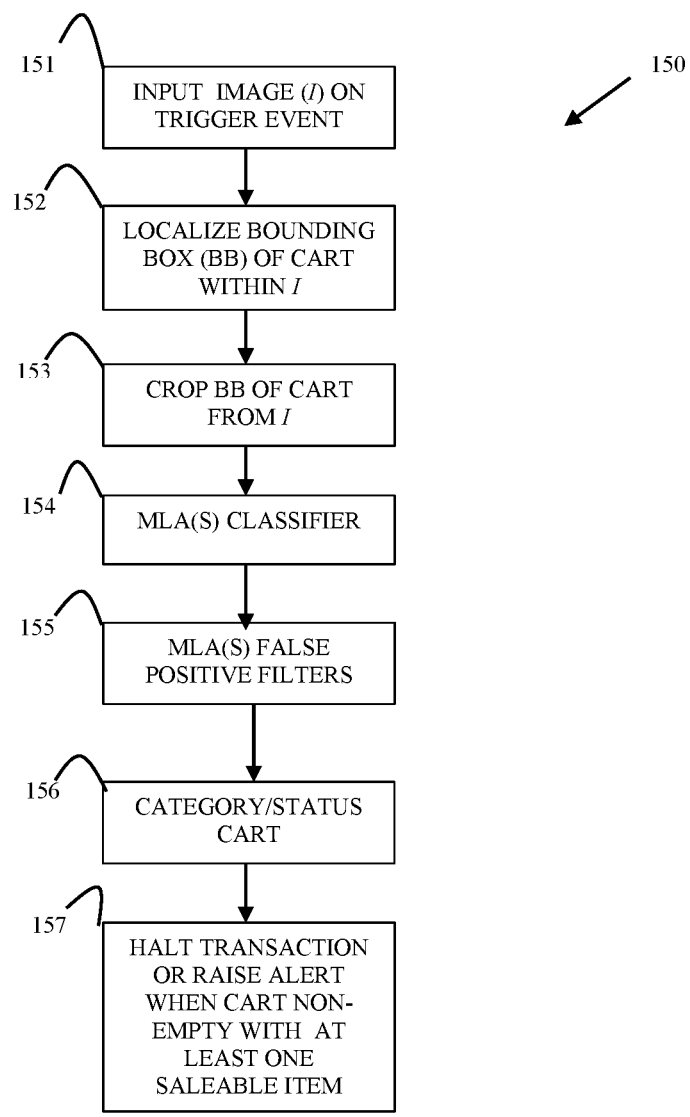
FIG. 1B is a diagram of a method for cart/basket fraud detection processing, according to an example embodiment.

In an embodiment, the cart/basket fraud manager is all or some combination of 133-136 and/or method 150 of FIG. 1B.

At 210, the cart/basket fraud manager obtains an image of a transaction area during a transaction at a transaction terminal based on detection of a transaction event.

In an embodiment, at 211, the cart/basket fraud manager detects the transaction event as a payment request for a payment of the transaction, which is made at the transaction terminal to complete the transaction.

In an embodiment of 211 and at 212, the cart/basket fraud manager obtains the image as a last image captured of the transaction area just before the payment request or when the payment request was made at 211.

At 220, the cart/basket fraud manager determines whether a cart/basket is present within the image.

In an embodiment, at 221, the cart/basket fraud manager provides the image to a trained MLM as input and receives as output pixel coordinates within the image that define edges and an area associated with the cart/basket.

In an embodiment of 221 and at 222, the cart/basket fraud manager defines a bounding box within the image for the cart/basket based on the pixel coordinates.

In an embodiment of 222 and at 223, the cart/basket fraud manager crops the bounding box out of the image creating a modified version of the image.

In an embodiment of 223 and at 224, the cart/basket fraud manager scales or resizes the modified version of the image into a canonical normalized size.

At 230, the cart/basket fraud manager determines whether the cart/basket is nonempty or empty when the cart/basket was present within the image.

In an embodiment of 224 and 230, at 231, the cart/basket fraud manager provides the modified version of the image in the canonical normalized size to a second MLM as input and receives as output a nonempty classification for the cart/basket or an empty classification for the cart/basket.

At 240, the cart/basket fraud manager determines whether the cart/basket includes at least one saleable item when the cart/basket is nonempty.

In an embodiment of 231 and 240, at 241, the cart/basket fraud manager provides, when output from the second MLM was the nonempty classification, the modified version of the image in the canonical normalized size to a plurality of cascading third MLMs. The cart/basket fraud manager receives as output from the third MLMs indications as to whether the cart/basket comprises legitimate non-saleable items or one or more saleable items.

At 250, the cart/basket fraud manager causes the transaction to suspend for intervention of the transaction when the cart/basket includes at least one saleable item.

In an embodiment of 241 and 250, at 251, the cart/basket fraud manager processes an API call to alert a transaction system associated with the transaction terminal when at least one of the outputs from the third MLMs identifies at least one saleable item causing the transaction terminal to suspend the transaction and prevent its completion.

In an embodiment of 251 and at 252, the cart/basket fraud manager provides saleable item identifiers with the alert for identifying each of the one or more saleable items to the transaction system and the transaction terminal. In this way, when the transaction system dispatches an attendant to the transaction terminal for the intervention, the attendant upon signing onto the transaction terminal can view the specific saleable items that are believed to have not been processed for the transaction, since they remained in the cart/basket during the transaction.

Figure 3:
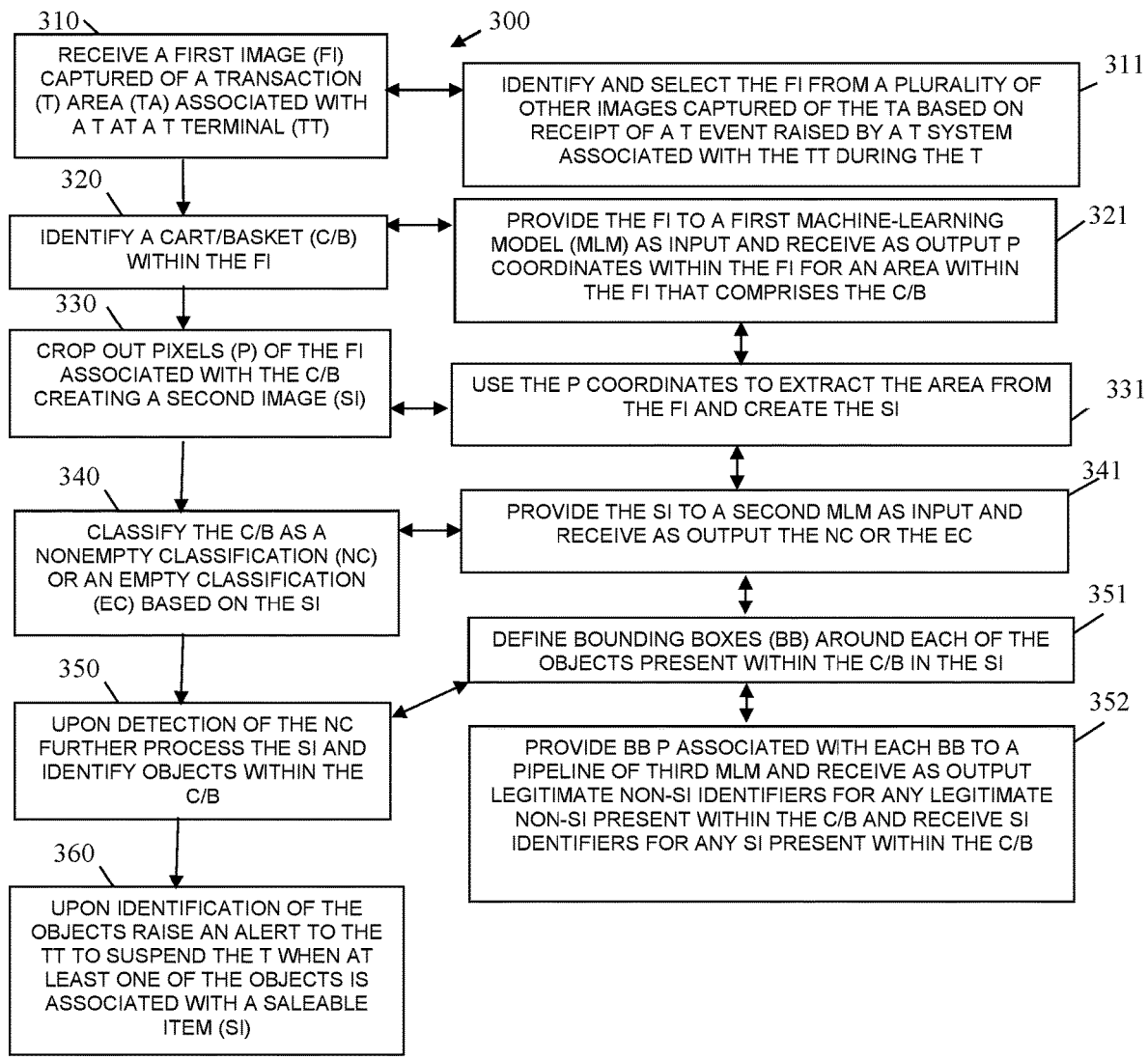
FIG. 3 is a diagram of still another method for cart/basket fraud detection processing, according to an example embodiment

FIG. 3 is a diagram of a method 300 for cart/basket fraud detection processing, according to an example embodiment. The software module(s) that implements the method 300 is referred to as a "cart/basket transaction alert manager." The cart/basket transaction alert manager is implemented as executable instructions programmed and residing within memory and/or a non-transitory computer-readable (processor-readable) storage medium and executed by one or more processors of a device or set of devices. The processor(s) of the device that executes the cart/basket transaction alert manager are specifically configured and programmed to process the cart/basket transaction alert manager. The cart/basket transaction alert manager may have access to one or more network connections during its processing. The network connections can be wired, wireless, or a combination of wired and wireless.

In an embodiment, the device that executes the cart/basket transaction alert manager is server 120. In an embodiment, server 120 is one of multiple servers that cooperate and logically present as a single server associated with a cloud processing environment (cloud 120).

In an embodiment, the cart/basket transaction alert manager is all of, or some combination of, 133-136, method 150 of FIG. 1B, and/or method 200 of FIG. 2.

The cart/basket transaction alert manager represents another and, in some ways, an enhanced processing perspective of what was discussed above for the method 150 and the method 200.

At 310, the cart/basket transaction alert manager receives a first image captured of a transaction area associated with a transaction being performed at a transaction terminal.

In an embodiment, at 311, the cart/basket transaction alert manager identifies and selects the first image from a plurality of other images captured of the transaction area based on a receipt of a transaction event raised by a transaction system associated with the transaction terminal during the transaction.

At 320, the cart/basket transaction alert manager identifies a cart/basket within the first image.

In an embodiment, at 321, the cart/basket transaction alert manager provides the first image to a first MLM as input and receives as output pixel coordinates within the first image for an area within the first image that comprises or defines the cart/basket.

At 330, the cart/basket transaction alert manager crops out pixels of the first image associated with the cart/basked creating a second image.

In an embodiment of 321 and 330, at 331, the cart/basket transaction alert manager uses the pixel coordinates to extract the area from the first image and create the second image.

At 340, the cart/basket transaction alert manager classifies the cart/basket as a nonempty classification, or an empty classification based on the second image.

In an embodiment of 331 and 340, at 341, the cart/basket transaction alert manager provides the second image to a second MLM as input and receives as output the nonempty classification or the empty classification.

At 350, the cart/basket transaction alert manager, upon detection of the nonempty classification, further processes the second image and identifies objects within the cart/basket.

In an embodiment of 341 and 350, at 351, the cart/basket transaction alert manager defines bounding boxes around each of the objects present within the cart/basket in the second image.

In an embodiment of 351 and at 352, the cart/basket transaction alert manager provides bounding box pixels associated with each bounding box to third MLMs and receives as outputs legitimate non-saleable item identifiers for any legitimate non-saleable items present within the cart/basket and receives saleable item identifiers for any saleable items present within the cart/basket.

At 360, the cart/basket transaction alert manager, upon identification of the objects, raises an alert to the transaction terminal to suspend the transaction when at least one of the objects is associated with a saleable item.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
obtaining an image of a transaction area during a transaction at a transaction terminal based on a transaction event and using metadata comprising a camera identifier, a time stamp, and location information associated with the image to identify a specific transaction terminal for the transaction terminal where the transaction event occurred, and a specific store associated with the transaction terminal;
wherein obtaining further includes:
obtaining the image as a last image captured of the transaction area just before a payment request is made to complete the transaction at the transaction terminal;
determining whether a cart/basket is present within the image;
determining whether the cart/basket is nonempty or empty when the cart/basket is present within the image using a machine learning model that processes the image to detect a presence of the cart/basket based on learned characteristics of carts/baskets specific to an environment of the specific store;
wherein the machine learning model is trained on images of transaction areas to recognize and identify, within the images, boundaries and a particular transaction area associated with a cart/basket;
wherein during re-training to account for false cart/basket detections or no cart/basket detection, each original trained image is replicated, rotated, and manipulated for scaling and/or brightness variations and used to re-train the machine learning model;
determining whether the cart/basket includes at least one saleable item when the cart/basket is nonempty; and
causing the transaction to suspend for intervention of the transaction when the cart/basket includes the at least one saleable item.

2. The method of claim 1, wherein obtaining further includes detecting the transaction event as the payment request for a payment of the transaction made at the transaction terminal.

3. The method of claim 1, wherein determining whether the cart/basket is present within the image further includes providing the image to the machine learning model as input and receiving, as an output, pixel coordinates within the image that define edges and an area associated with the cart/basket.

4. The method of claim 3, wherein providing further includes defining a bounding box within the image based on the pixel coordinates.

5. The method of claim 4, wherein defining further includes cropping the bounding box out of the image creating a modified version of the image.

6. The method of claim 5, wherein cropping further includes scaling or resizing the modified version of the image to a canonical normalized size.

7. The method of claim 6, wherein determining whether the cart/basket is nonempty or empty further includes providing the modified version of the image in the canonical normalized size to a second machine learning model as input and receiving as output a nonempty classification or an empty classification from the second machine learning model.

8. The method of claim 7, wherein determining whether the cart/basket includes the at least one saleable item further includes providing, when output from the second machine learning model was the nonempty classification, the modified version of the image in the canonical normalized size to a plurality of third machine-learning models as input and receiving, as outputs, indications as to whether the cart/basket comprises legitimate non-saleable items or the at least one saleable item.

9. The method of claim 8, wherein causing further includes processing an Application Programming Interface (API) call to send an alert to a transaction system associated with the transaction terminal when at least one of the outputs from the plurality of third machine-learning models identifies the at least one saleable item causing the transaction terminal to suspend completion of the transaction.

10. The method of claim 9, wherein processing the API call further includes providing at least one saleable item identifiers with the alert for the at least one saleable item.

11. A method, comprising:
receiving a first image captured of a transaction area associated with a transaction at a transaction terminal and using metadata comprising a camera identifier, a time stamp, and location information associated with the first image to identify a specific transaction terminal for the transaction terminal where a transaction event occurred, and a specific store associated with the transaction terminal;
wherein receiving further includes:
obtaining the first image as a last image captured of the transaction area just before a payment request is made to complete the transaction at the transaction terminal;
identifying a cart/basket within the first image using a machine learning model trained to recognize carts/baskets based on specific characteristics relevant to an environment of the specific store;
wherein identifying the cart/basket includes using a K-Means clustering algorithm to identify a substantial center of the cart/basket;

cropping out pixels of the first image associated with the cart/basket creating a second image;

classifying the cart/basket as a nonempty classification or an empty classification based on the second image;

upon detecting the nonempty classification further processing the second image and identifying objects within the cart/basket; and upon identifying the objects raising an alert to the transaction terminal to suspend the transaction when at least one of the objects is associated with a saleable item.

12. The method of claim 11, wherein receiving further includes identifying and selecting the first image from a plurality of other images captured of the transaction area based on receipt of the transaction event raised by a transaction system associated with the transaction terminal during the transaction.

13. The method of claim 11, wherein identifying further includes providing the first image to the machine learning model as input and receiving, as output, pixel coordinates within the first image for an area within the first image that comprises the cart/basket.

14. The method of claim 13, wherein cropping out the pixels further includes using the pixel coordinates to extract the area from the first image and creating the second image.

15. The method of claim 14, wherein classifying further includes providing the second image to a second machine learning model as input and receiving as output the nonempty classification of the empty classification.

16. The method of claim 15, wherein upon detecting the nonempty classification further includes defining bounding boxes around each of the objects present within the cart/basket in the second image.

17. The method of claim 16, wherein upon detecting the nonempty classification further includes providing bounding box pixels associated with each bounding box to a pipeline of third machine-leaning models and receiving as output legitimate non-saleable item identifiers for any legitimate non-saleable items present within the cart/basket and receiving saleable item identifiers for any saleable items present within the cart/basket.

18. A system, comprising:

a cloud processing environment comprising at least one processor and a non-transitory computer-readable storage medium;

the non-transitory computer-readable storage medium comprises executable instructions;

the executable instructions when executed by the at least one processor from the non-transitory computer-readable storage medium cause the at least one processor to perform operations comprising:

detecting a transaction event at a transaction terminal during a transaction indicating that payment processing for the transaction was requested by an operator of the transaction terminal and using metadata comprising a camera identifier, a time stamp, and location information associated with an image to identify a specific transaction terminal for the transaction terminal where the transaction event occurred, and a specific store associated with the transaction terminal;

obtaining the image of a transaction area associated with the transaction terminal;

wherein obtaining further includes:

obtaining the image as a last image captured of the transaction area just before the payment processing for the transaction was requested;

providing the image to a first machine learning model and receiving, as output, pixel coordinates for a cart/basket present within the image;

wherein the first machine learning model is specifically trained to recognize carts/baskets based on characteristics specific to an environment of the specific store;

wherein the first machine learning model is a YOLO trained model;

cropping the pixel coordinates out of the image creating a second image;

resizing the second image into a canonical size;

providing the second image in the canonical size to a second machine learning model and receiving as output a nonempty classification for the cart/basket or an empty classification for the cart/basket;

upon detecting the nonempty classification, providing the second image in the canonical size to a plurality of filtering machine-learning models as input and receiving as output one or more non-saleable item identifiers for legitimate items present within the cart/basket and one or more saleable item identifiers for saleable items present within the cart/basket; and upon detecting at least one saleable item identifier, sending an alert to a transaction system associated with the transaction terminal that causes the transaction to be suspended without performing the payment processing for the transaction and that causes an attendant to be dispatched to the transaction terminal for an audit of the transaction.

19. The system of claim 18, wherein the transaction terminal is a Self-Service Terminal (SST) or a Point-Of-Sale (POS) terminal.

* * * * *